(12) United States Patent
Bowen

(10) Patent No.: US 8,208,624 B2
(45) Date of Patent: Jun. 26, 2012

(54) HEARING AID COMPATIBLE MOBILE PHONE

(75) Inventor: James Samuel Bowen, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1451 days.

(21) Appl. No.: 11/634,831

(22) Filed: Dec. 5, 2006

(65) Prior Publication Data

US 2008/0130867 A1 Jun. 5, 2008

(51) Int. Cl.
*H04M 1/00* (2006.01)
*H04M 9/00* (2006.01)

(52) U.S. Cl. .............. 379/433.02; 379/443; 455/556.1; 455/575.6

(58) Field of Classification Search .............. 455/550.1, 455/556.1, 556.2, 569.1, 575.1, 575.2, 575.3, 455/575.4, 567

See application file for complete search history.

(56) References Cited

U.S. PATENT DOCUMENTS

| | | | | |
|---|---|---|---|---|
| 6,062,887 | A * | 5/2000 | Schuster et al. ............ | 439/218 |
| 6,385,328 | B1 * | 5/2002 | Yoo et al. ................... | 381/412 |
| 6,434,407 | B1 * | 8/2002 | Cook ......................... | 455/569.1 |
| 6,925,179 | B2 * | 8/2005 | Waldron et al. .............. | 379/443 |
| 7,106,874 | B2 * | 9/2006 | Wieczorek et al. ........... | 381/331 |
| 7,117,010 | B2 | 10/2006 | Shively et al. | |
| 7,317,807 | B1 * | 1/2008 | Waldron ....................... | 381/331 |
| 7,556,443 | B2 * | 7/2009 | Kleverman ................... | 396/529 |
| 2003/0003945 | A1 * | 1/2003 | Saiki et al. ................... | 455/550 |
| 2004/0240692 | A1 | 12/2004 | Julstrom | |
| 2004/0240696 | A1 | 12/2004 | Shively et al. | |
| 2005/0244022 | A1 * | 11/2005 | Muthuswamy et al. ...... | 381/315 |
| 2006/0126873 | A1 | 6/2006 | Lee | |
| 2006/0133633 | A1 | 6/2006 | Hyvonen et al. | |

FOREIGN PATENT DOCUMENTS

WO WO 02/45461 6/2002

OTHER PUBLICATIONS

"Wireless Telecommunications Bureau Seeks Comments on . . . ", Public Notice, Federal Communications Commission, Nov. 8, 2006, pp. 1-2.

"Microspeakers," Hoisden, RE: Patent Submission—HAC speakerphone, Oct. 24, 2007, pp. 1-3.

* cited by examiner

*Primary Examiner* — Davetta W Goins
*Assistant Examiner* — Phylesha Dabney

(57) ABSTRACT

A device such as a mobile phone includes a device to be hearing aid compatible. The device may include a first speaker for private listening operation and a second speaker that provides both speakerphone operation and hearing aid (e.g. telecoil) operation. The device may include a first use position for normal listening and a second, substantially different, use position for telecoil operation.

21 Claims, 5 Drawing Sheets

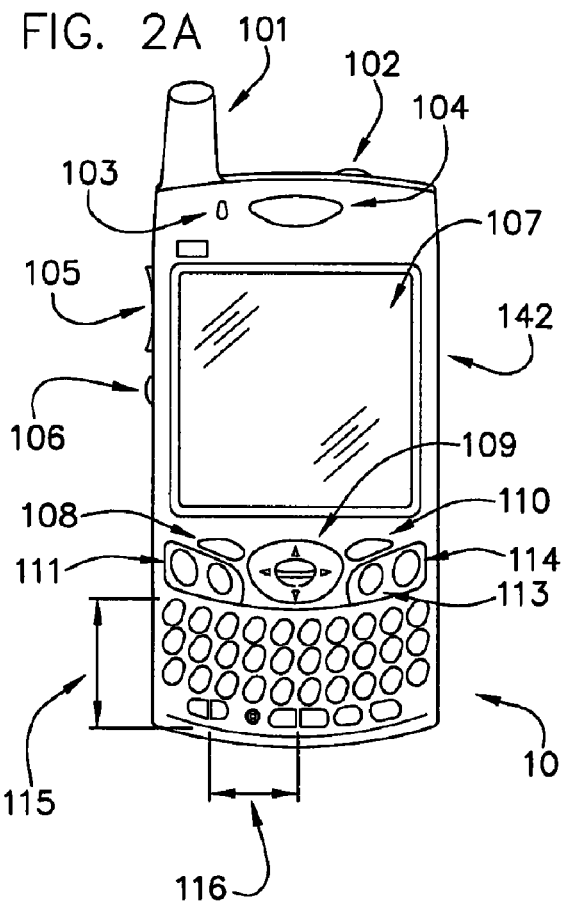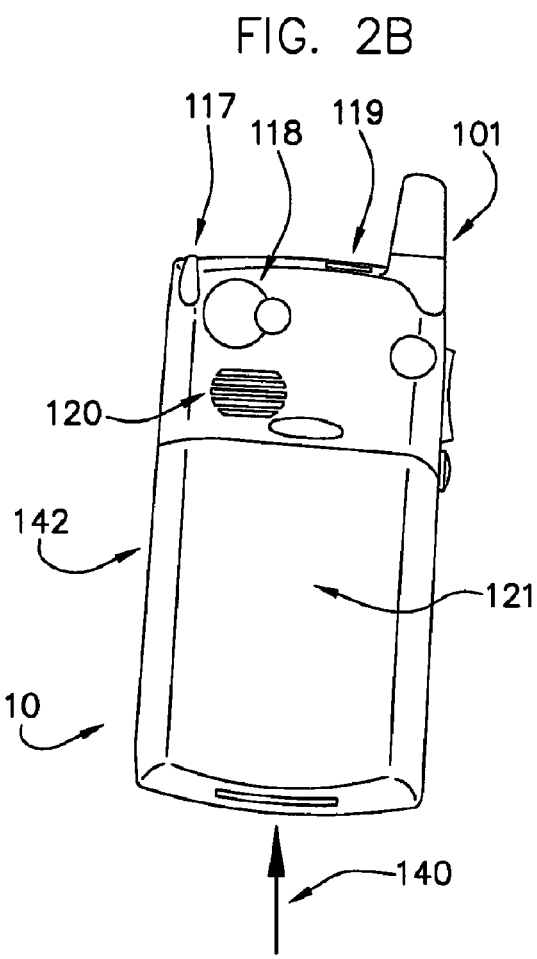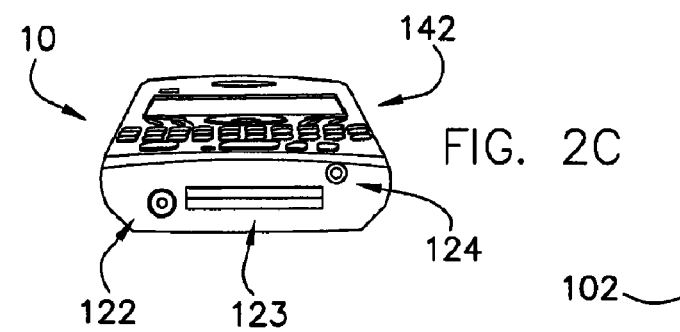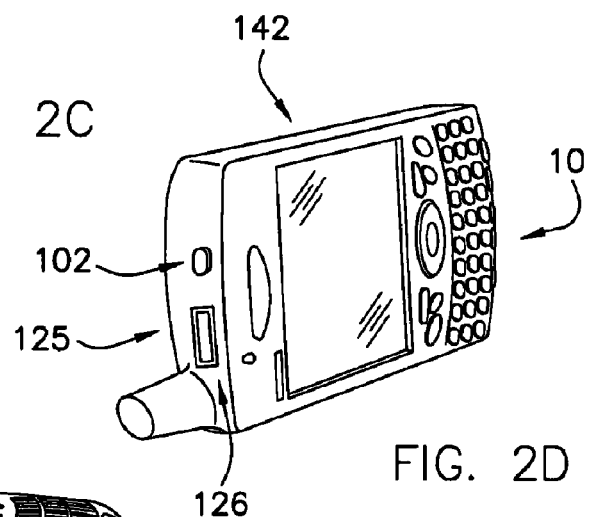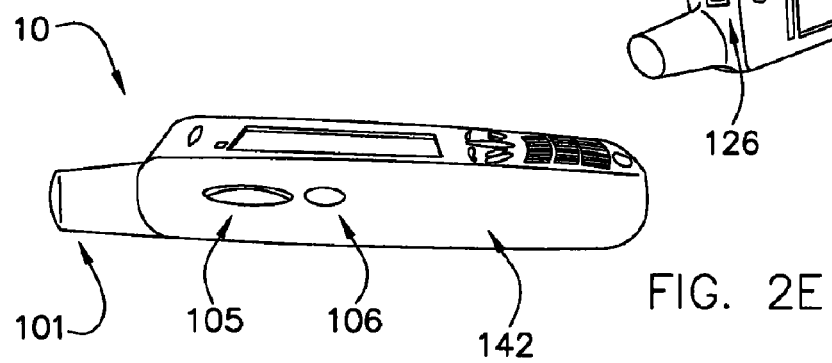

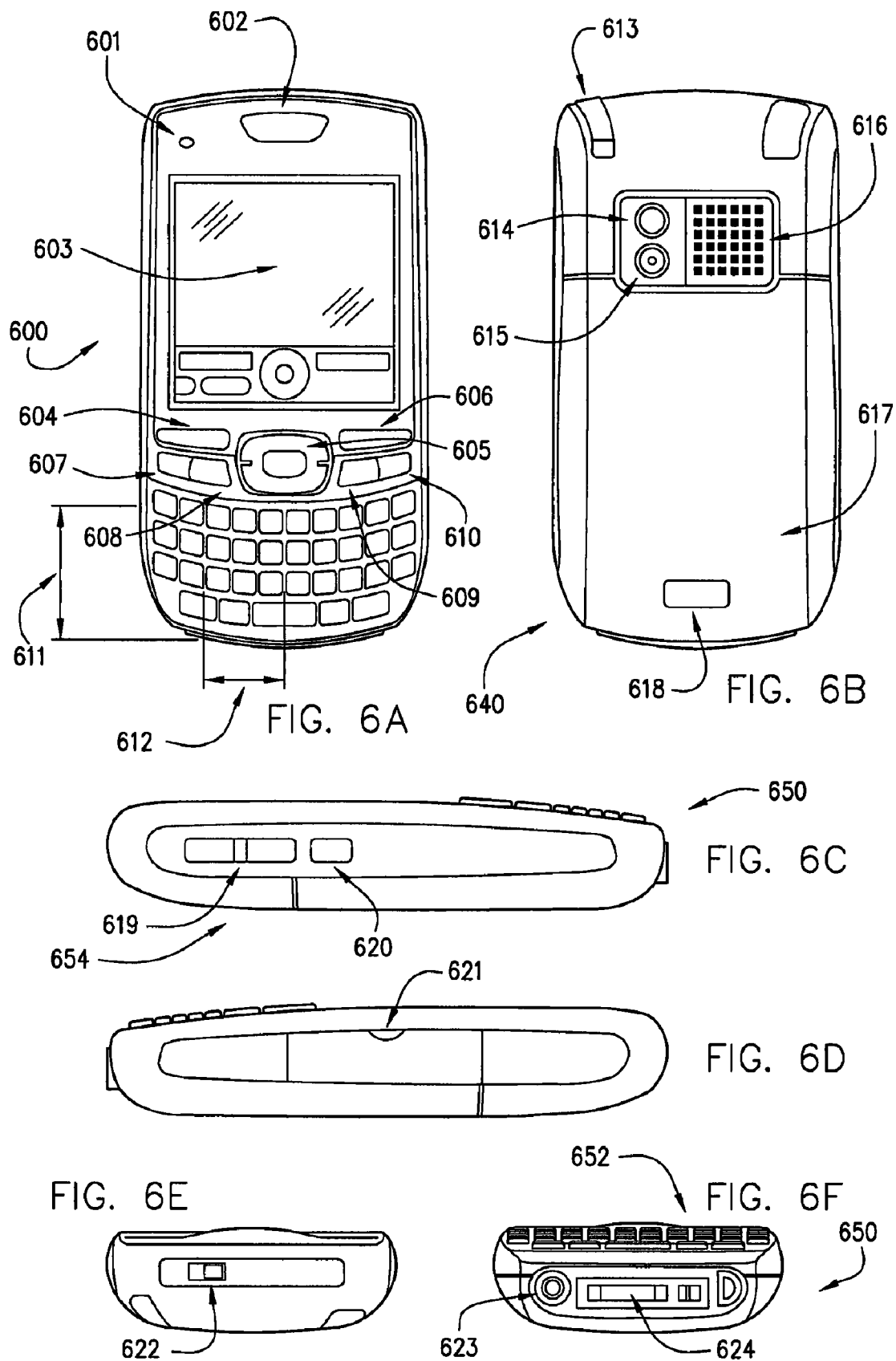

HEARING AID COMPATIBLE MOBILE PHONE

BACKGROUND

The present invention relates generally to the field of hearing aid compatible devices.

Typical speakers from phone handsets may be difficult for hearing aids to pick up, making use of a standard phone with a hearing aid more difficult. To overcome this problem, many hearing aids use a telecoil to amplify voice signals received from a telephone's speaker by coupling to a magnetic field produced by the speaker during use and reproducing the sound produced by the speaker using the magnetically coupled signal. The hearing aid then converts the received signal into an audible (sound) signal and may further reproduce the audible signals at the volume set by the user. Many hearing aids allow a user to switch between a normal listening mode where the hearing aid detects and amplifies sound received by the hearing aid, and a telecoil mode where the hearing aid uses the telecoil to produce the sound provided to the user.

Although wireless phones were previously exempt from being compatible with hearing aids, the Federal Communications Commission (FCC) has modified the previous exemption for wireless phones under the Hearing Aid Compatibility (HAC) Act of 1988 to require that wireless phone manufacturers and wireless phone service providers make digital wireless phones accessible to individuals who use hearing aids. Wireless phones which meet this new requirement are sometimes referred to as HAC-compliant.

Telecoils used in typical land-line telephone headsets produce a magnetic field in the direction of an induction coil of a hearing aid worn by the telephone's user. The telecoil produces the magnetic field to reduce an amount of feedback (e.g., whistle, hum, etc.) generated when an object such as a telephone handset is placed in close proximity to the hearing aid's microphone. The hearing aid's telecoil couples to the magnetic field and uses this magnetic field to provide a desired tone quality.

BRIEF DESCRIPTION OF THE DRAWINGS

FIG. 2A is an illustration of a front side of a mobile phone according to one embodiment;

FIG. 2B is an illustration of a back side of a mobile phone according to the embodiment of FIG. 2A;

FIG. 2C is an illustration of a bottom side and front side of a mobile phone according to the embodiment of FIG. 2A;

FIG. 2D is an illustration of a top side and front side of a mobile phone according to the embodiment of FIG. 2A;

FIG. 2E is an illustration of a left side of a mobile phone according to the embodiment of FIG. 2A;

FIGS. 6A-F are diagrams of a mobile phone according to another embodiment

DETAILED DESCRIPTION OF THE PREFERRED EMBODIMENTS

Figure 1:
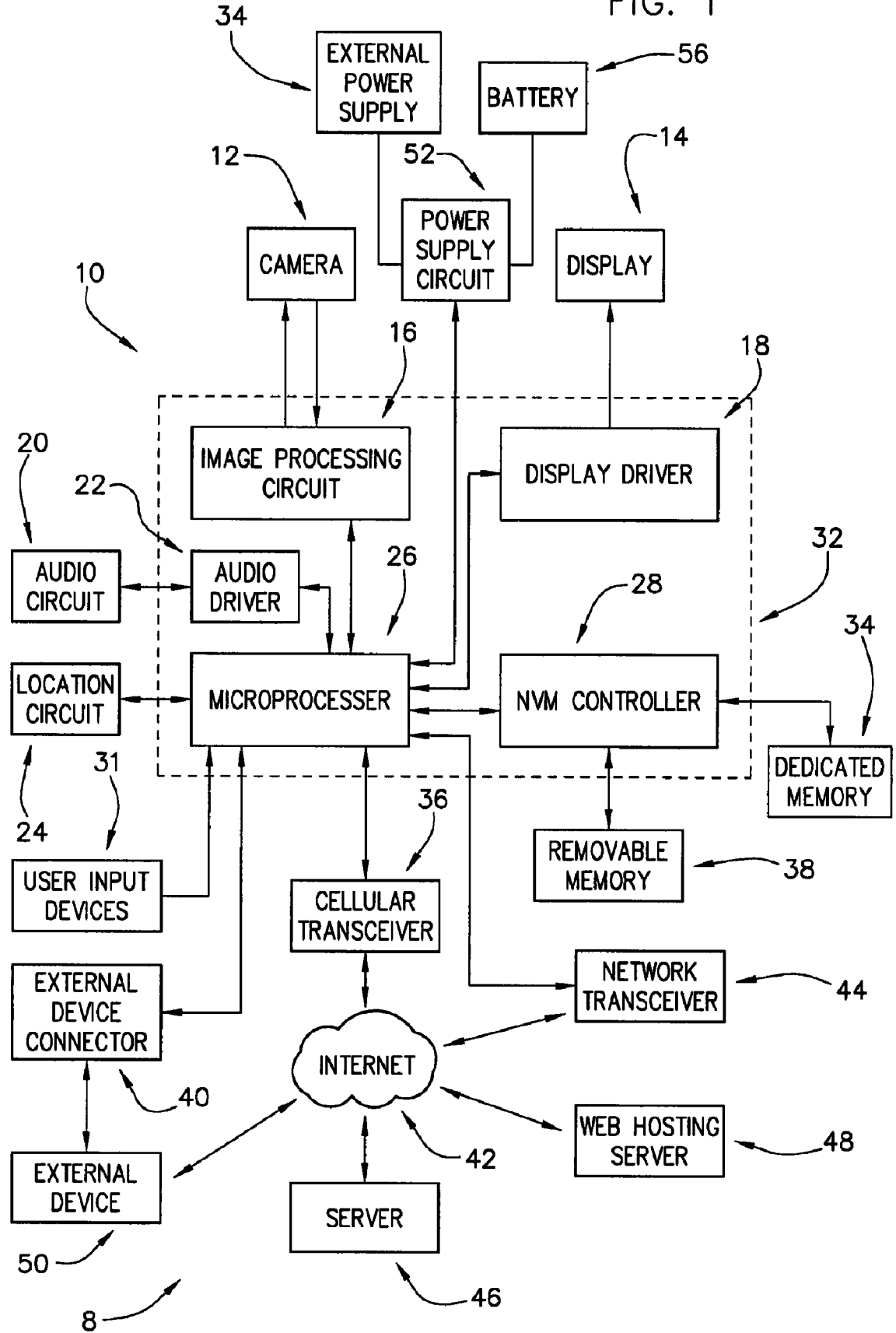
FIG. 1 is a component diagram of a hearing aid compatible mobile phone according to one embodiment.

Referring to FIG. 1, a system 8 includes a portable handheld device 10. The portable handheld device 10 may be a cell phone (such as a Smartphone) that includes a cellular transceiver 36. The device 10 would typically include one or more audio circuits 20 (e.g. speakers, microphone, etc.) configured to provide or receive audible information. Information received from and/or provided to the audio circuits 20 may be processed by a processing circuit 32. The processing circuit 32 may include a microprocessor 26 coupled to an audio processing circuit 22. Audio processing circuit 22 may include any number of components such as a D/A converter, an A/D converter, an amplifier, a CODEC, resistors, etc.

In one embodiment, processing circuit 32 may be configured to receive voice data over a cellular network using cellular transceiver 36. The voice data may be digital voice data. Processing circuit 32 may then process the voice data such that it can be output to one or more audio circuits 20 such that a user may listen to the voice information represented by the voice data.

For people who are hard of hearing, listening to the voice information as sound output from a speaker 20 may be difficult. Thus, device 10 may also be configured to output the data in a manner that is more conducive to reception by someone who is hard of hearing. In many embodiments, this may be done by outputting a signal from device 10 that can be received by a user's hearing aid (e.g. the telecoil of a user's hearing aid). Device 10 may send an electromagnetic signal which can be received by the telecoil of the hearing aid using the coil of a speaker circuit 20 used to create sound from the speaker 20. Where device 10 may include more than one speaker with differing maximum volume outputs, device 10 may be configured to use the louder of the speakers to provide the signal to the hearing aid.

Referring to FIGS. 2A and 2B, device 10 may include multiple audio output devices 104,120 (e.g. speakers) configured to provide audible information to a user. A first speaker 104 may be configured to provide sound output for use in a private listening mode. Speaker 104 may be configured to provide voice sound at a volume that is primarily intended for listening by holding speaker 104 proximate to a user's ear. However, speaker 104 may be configured such that it can provide sufficient volume to allow the speaker 104 to be heard even though not held directly to the user's ear.

In some embodiments, speaker 104 may have a length (i.e. longest dimension, diameter, etc.) of up to about 15 mm or up to about 10 mm. In some embodiments, speaker 104 may have a length of at least about 5 mm. In some embodiments, speaker 104 may have a width of up to about 10 mm or up to about 5 mm.

Device 10 may also include a second speaker 120. Speaker 120 may be located on a different side of device 10 than speaker 104 (e.g. on opposite sides of phone 10 as illustrated in FIGS. 2A-B). Speaker 104 may be located on a front face of device 10 while speaker 120 may be located on a back face of device 10. Speaker 120 may be a loudspeaker.

Exemplary embodiments of speaker 120 include microspeakers made by Hosiden, including HDR9304, HDR2082, HDR9164, HDR9152; and polyphonic speakers made by American Audio Components Incorporated, including DMST1318C-01-G, DMSP1214D-C1-FB-G, DMS1808B-05-G, DMS1708B-01-G, DMS1608E-01-G, DMS1508H-02-G, and DMS1508C-030G.

In some embodiments, speaker 120 may be configured to be used to provide voice information sound in a speakerphone mode. In speakerphone mode, the volume of speaker 120 may be set such that a user may clearly hear the voice information sound from speaker 120 even though device 10 may be located at a distance (e.g. over a foot away) from the user's ear. In many embodiments, speaker 120 is configured to provide a louder maximum volume than speaker 104.

In addition to (or as an alternative to) providing speakerphone operation, in some embodiments speaker 120 may provide sound output for any number of different applications. Where processing circuit 32 is configured to run a media player (e.g. a music player such as an MP3 player) application, speaker 120 may be used to output the sound based on data from the media player. Speaker 120 may also be used to provide ring tones that alert a user to an incoming call, particularly for ring tones that are high quality (e.g. MP3 quality) music tones, may be used for a push to talk (PTT) calling mode, may be used for sounds from video games, may be used for prompting a user for device programming instructions, and/or may be used for some other sound function.

In addition to providing sound, the circuit components of speaker 120 may also be used to provide a signal to be received by the hearing aid (e.g. the telecoil of the hearing aid) such that the voice information (and/or other information) can be received by the user of the hearing aid without requiring the hearing aid to pick up sound output by a speaker 104,120 of device 10. In one embodiment, as discussed with respect to FIG. 3, a coil 204 used to drive the speaker 120 (206) to provide audible sound can also be used to provide an electromagnetic signal that may be received by a telecoil in a hearing aid worn by a user.

The strength of the signal to the hearing aid may be varied as desired. In some embodiments, the strength of the signal may be configured such that a hearing aid that is more than 100 mm or 50 mm away from the location of speaker 120 would not reliably receive a clear signal from device 10. In some of these embodiments, the strength of the signal may be configured such that a hearing aid that is more than about 30 mm away from the location of speaker 120 would not reliably receive a clear signal from device 10. In some embodiments, a signal from a speaker 120 located on one side of device 10 would not be clearly and/or reliably receivable on an opposite side of device 10. For example, a speaker 120 on a back face of device 10 may be configured such that it does not provide a clear signal to a hearing aid located on a front face of device 10.

In some embodiments, speaker 120 has a length of up to about 40 mm or up to about 30 mm. In some embodiments, speaker 120 has a length of up to about 25 mm or 20 mm. In some embodiments, speaker 120 has a length of at least about 15 mm or at least about 20 mm. In some embodiments, speaker 120 has a length of at least 16 mm. Speaker 120 may be a rounded speaker which has a diameter that defines its length.

Phones 10 typically include at least one housing 142 configured to contain the components of the phone 10. Speaker 120 may be configured to provide sound output out of housing 142 on a first (e.g. back) side of the phone 10, while speaker 104 provides sound output out of the housing on a second (e.g. front) side of the phone 10. Microphone 124 (FIG. 2C) may be located within housing 142 and be configured to detect sound signals (e.g. a user's voice) from an opening in housing 142 on a third side (e.g. bottom) of phone 10 different than first and second sides from which the speakers provide sound.

Speaker 120 may be configured to provide sound output out of housing 142 on a different side of phone 10 than the side on which a display 107 is located (e.g. the side where the primary display is located in a use position for phones having more than one display). Speaker 120 may be configured to provide sound output out of housing 142 on a different side of phone 10 than the side on which at least one of a keyboard 115 and a keypad 116 are located. Speaker 120 may be configured to provide sound output out of housing 142 on a different side of phone 10 than the side on which at least one of a call button ### and an end button ### is located. Speaker 120 may be configured to provide sound output out of housing 142 on a different side of phone 10 than the side on which a navigator input 109 is located.

Device 10 may also include an antenna 101 coupled to cellular transceiver 36 (FIG. 1). Antenna 101 may be configured to project from a main body 142 of device 10. Speaker 120 may be located away from antenna 101. In some embodiments embodiment, speaker 120 is located proximate an opposite side of device 10 than a side proximate to antenna 101 (as illustrated in FIGS. 2A and 2B). In some embodiments, speaker 120 is located to an opposite side of a centerline 140 (between two sides of device 10) than antenna 101. In some embodiments, speaker 120 is located at least about 20 mm or about 30 mm from antenna 101. In some of these embodiments, speaker 120 is located at least about 40 mm or about 50 mm from antenna 101.

Figure 3:
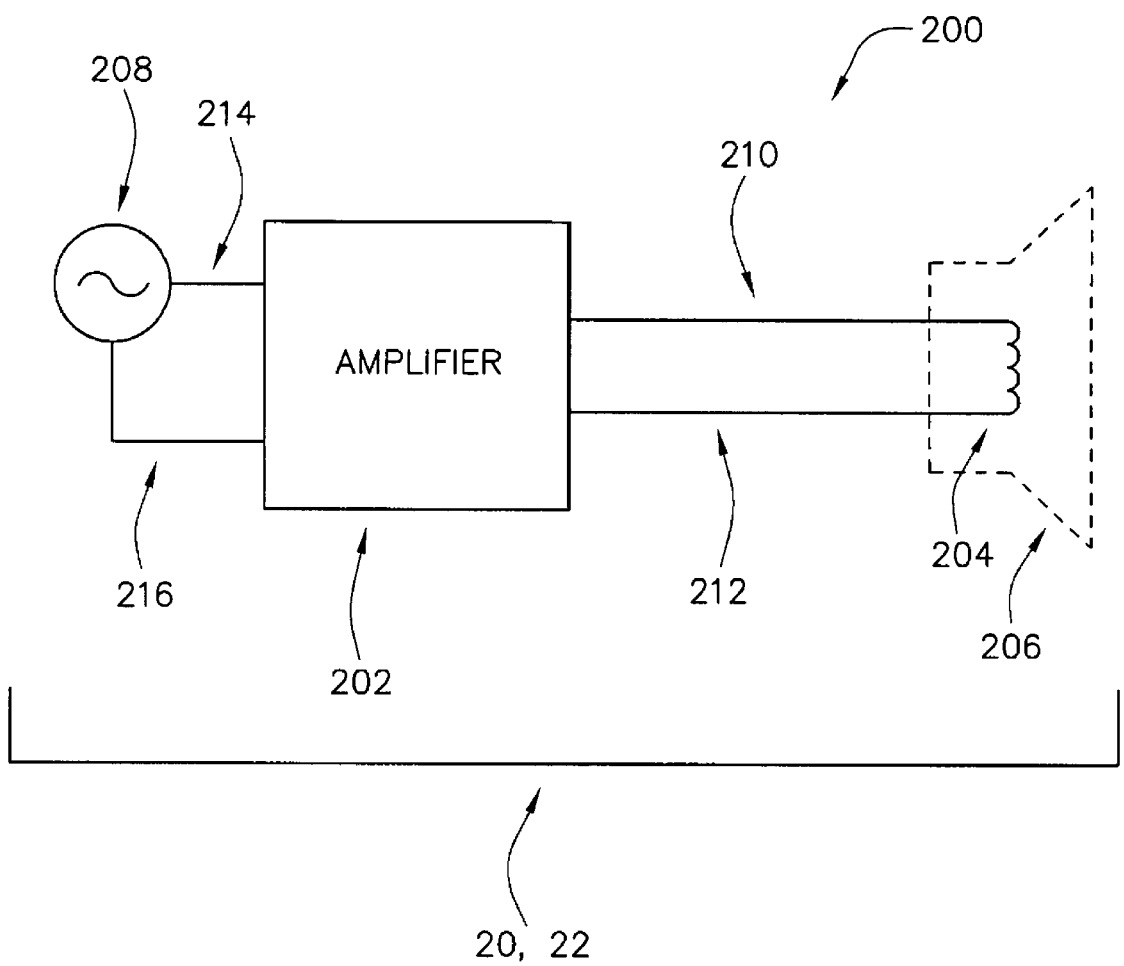
FIG. 3 is a diagram of an audio circuit and speaker according to one embodiment.

Referring to FIG. 3, an audio circuit 20,22 includes an amplifier 202 which is configured to receive a signal (generally an analog signal) from a signal source 208 (e.g. from a portion of processing circuit 32). The amplifier 202 amplifies the signal from the signal source and provides it to a coil 204. Based on the amplified signal, coil 204 may be configured to drive a speaker element (not shown) such that sound is produced from speaker 206. Coil 204 may also produce an electromagnetic signal in response to the amplified signal. The electromagnetic signal may be receivable by a telecoil of a hearing aid, as discussed above, such that the sound information from the amplified signal may be provided to the user of the hearing aid using the telecoil. The telecoil signal from coil 204 may have about the same frequency as the sound signal provided from speaker 206. In some embodiments, the telecoil signal is configured to be provided in at least a range of 100 Hz to 200 Hz, such as in at least a range of 100 Hz to 4 kHz.

In many embodiments, both the telecoil signal from coil 204 and the sound signal provided from speaker 206 will be provided each time an amplified signal is provided from amplifier 202. In some embodiments, only one of the telecoil signal and sound signal will be provided. In some embodiments, a user may select whether one or both signals will be provided.

In some embodiments, device 10 may give a user the option to switch between a HAC (e.g. telecoil) mode where the signal provided to coil 204 is optimized for hearing aid coupling (e.g. telecoil operation) and a speaker mode where the signal provided to coil 204 is optimized for speaker operation. Various parameters may be adjusted (i.e. may be different) between the HAC mode and the speaker mode such as frequency response and amplitude of the signal.

The user option may be a control option displayed on display 14 (FIG. 1) of device 10, may be a dedicated switch, or may take some other form. The control option may be switchable while a call is in progress or may be set once a call is started. The control option may give the user multiple options from which to choose, such as a sliding bar control option having multiple states, or may provide a choice between only two modes.

Amplitude may be adjusted by adjusting the gain of the amplifier, digital reduction prior to reaching the amplifier, adjustment by a digital signal processor (DSP), etc. Frequency response may be adjusted by a DSP prior to providing the signal to the amplifier, or may be adjusted in some other manner.

The optimum telecoil signal may be judged by the criteria used by the FCC to pass the HAC requirement. The optimum audio signal may be determined based on the acoustic frequency and level.

Circuit 20,22 may include any number of other components on lines 210-216 such as components to control the amount of amplification provided by amplifier 202, echo cancellation, digital signal processing, etc. Instead of having a combined speaker and telecoil coil 204, circuit 20,22 could have a separate telecoil coil on one of lines 210-216 (e.g. on line 210 or line 212).

Figure 5:
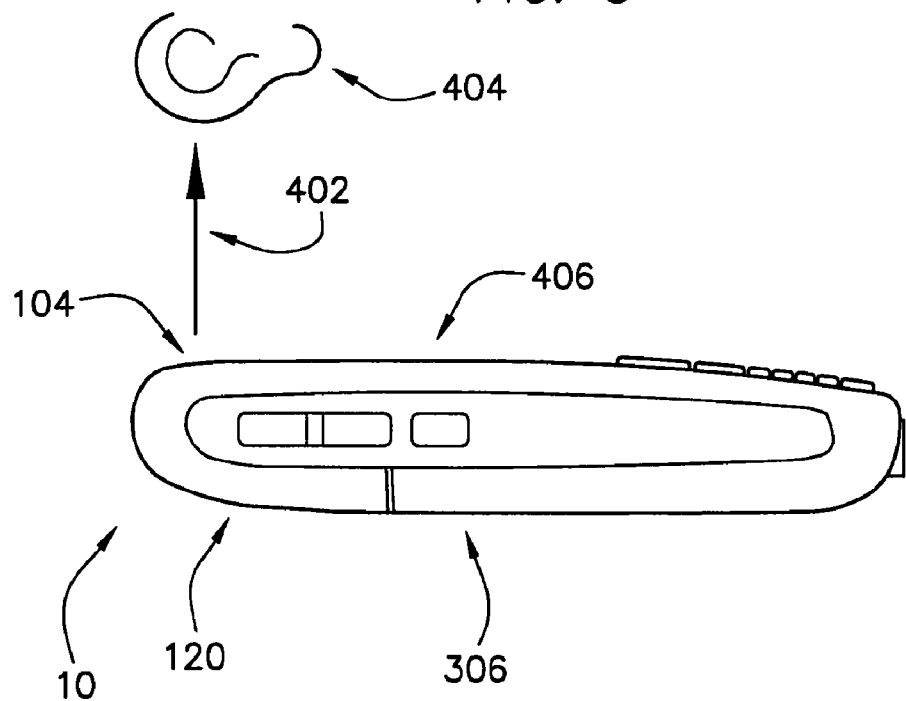
FIG. 5 is a diagram showing a listening position of a mobile phone in a normal listening mode according to one embodiment.
Figure 4:
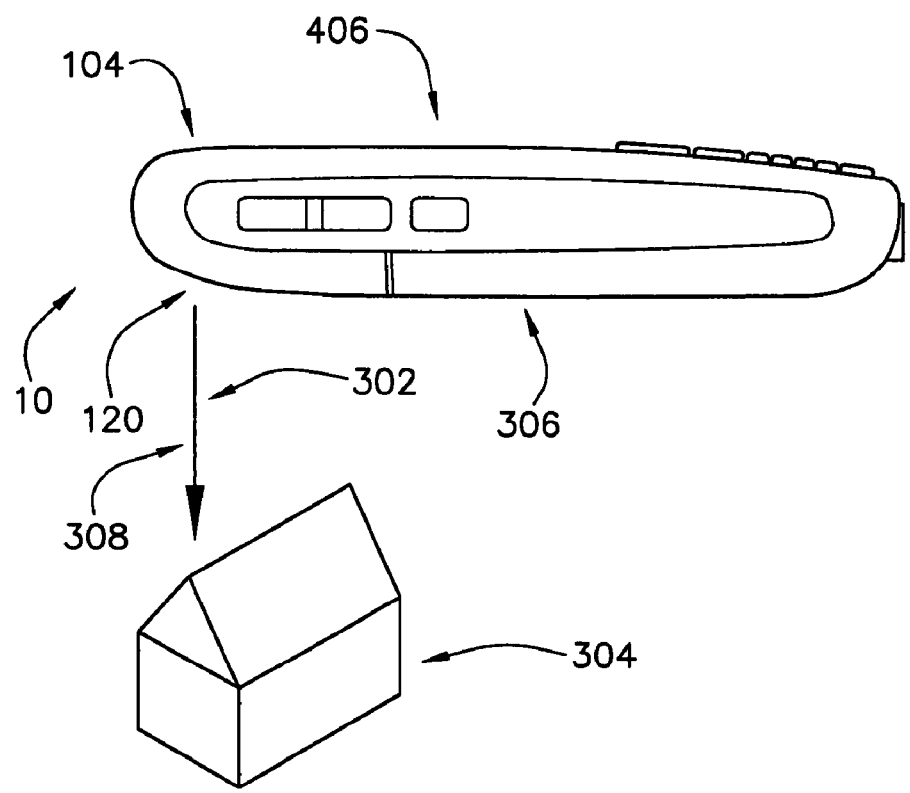
FIG. 4 is a diagram showing a listening position of a mobile phone in a hearing aid (e.g. telecoil) listening mode according to one embodiment.

Referring to FIGS. 4 and 5, a phone 10 may be designed to include a first use position (FIG. 5) for a private listening mode and a second use position (FIG. 4) for a telecoil listening mode. In the private listening mode, a user places their ear 404 proximate to speaker 104 of phone 10 on a first side 406 of phone 10. A sound signal 402 is produced from speaker 104 and travels to the user's ear 404.

In the telecoil listening mode, the user places the telecoil 304 of their hearing aid proximate to speaker 120 of phone 10 on a second side 306 of phone 10. A telecoil signal 302 is produced from speaker 120 and travels to the telecoil 304 where the signal can be translated by the user's hearing aid to be an audible sound signal. Speaker 120 may also produce a corresponding sound signal 308 which is audible to the user and may be picked up by the hearing aid in a normal operation mode of the hearing aid.

EXEMPLARY EMBODIMENTS

One embodiment is directed to a mobile phone having a first speaker circuit usable in a private listening phone mode and a second speaker circuit which is configured to send a signal usable by a telecoil of a hearing aid.

Another embodiment is directed to a mobile phone having a first speaker circuit that is configured to have a lower maximum volume than a second speaker circuit. The second speaker circuit is configured to send a signal usable by a telecoil of a hearing aid.

Another embodiment is directed to a mobile phone having a first face with a display. A speaker circuit capable of sending a signal usable by a telecoil of a hearing aid is located on a second face different than the first face. The second face may be opposite the first face.

Another embodiment is directed to a mobile phone having a first face with a dial pad. A speaker circuit capable of sending a signal usable by a telecoil of a hearing aid is located on a second face different than the first face. The second face may be opposite the first face.

Another embodiment is directed to a mobile phone having an external antenna. A speaker circuit capable of sending a signal usable by a telecoil of a hearing aid is located adjacent an opposite side of a housing of the phone than the side adjacent to the external antenna.

Another embodiment is directed to a mobile phone having a speaker circuit capable of sending a signal usable by a telecoil of a hearing aid. The speaker is located closer to a first side of the phone than a second side of the phone, the first side of the phone not being the top side or the front side of the phone. The first side of the phone may be a left side or right side of the phone. The speaker may be at least 70% of the way between the first and second sides.

Another embodiment is directed to a mobile phone having a speaker circuit capable of sending a signal usable by a telecoil of a hearing aid. The speaker is not centered from left to right of the phone. The speaker may be at least 70% of the way towards the left or right side.

Another embodiment is directed to a mobile phone having a normal listening position and a telecoil listening position. The telecoil listening position is substantially different than the normal listening position.

Another embodiment is directed to a mobile phone. The phone includes a transceiver configured to transfer voice information between the mobile phone and a network, and a speaker configured to provide speakerphone operation. The speaker includes an audio circuit configured to provide signals that cause the speaker to output audible sound. The audio circuit is configured to provide a signal configured to be received by a telecoil of a hearing aid.

Another embodiment is directed to a mobile phone. The phone includes a cellular transceiver configured to transfer voice information between the mobile phone and a cellular network, a first speaker configured to output audible sound at a first volume, a second speaker configured to output audible sound at a second volume louder than the first volume. The second speaker includes an audio circuit configured to provide signals that cause the speaker to output audible sound. The audio circuit is configured to provide a signal configured to be received by a telecoil of a hearing aid.

Another embodiment is directed to a mobile phone. The phone includes a cellular transceiver configured to transfer voice information between the mobile phone and a cellular network, a display configured to display information to a user, the display located on a first side of the phone, and a speaker including a circuit configured to output audible sound, the speaker outputting sound from a second side of the phone. The circuit is configured to provide a signal configured to be received by a telecoil of a hearing aid.

Another embodiment is directed to a mobile phone. The phone includes a cellular transceiver configured to transfer voice information between the mobile phone and a cellular network, a speaker for outputting audible sounds based on voice data received by the cellular transceiver in a private listening mode, the phone configured such that a user will place the phone in a normal listening position for listening to voice signals based on the voice data received by the cellular transceiver that is output by the speaker, and a coil for outputting magnetic fields based on voice data received by the cellular transceiver, the phone configured such that a user will place the phone in a telecoil listening position for listening to voice signals based on the voice data received by the cellular transceiver that is output by the coil. The telecoil listening position is substantially different than the normal listening position.

Other Features

Referring back to FIG. 1, portable device 10 may be a mobile computing device capable of executing software programs. The device 10 may be implemented as a combination handheld computer and mobile telephone, sometimes referred to as a smart phone. Examples of smart phones include, for example, Palm® products such as Palm® Treo™ smart phones. Although some embodiments may be described with portable device 10 implemented as a smart phone by way of example, it may be appreciated that the embodiments are not limited in this context. For example, portable device 10 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, camera, pager, messaging device, data communication device, and so forth.

Processing circuit 32 of hand-held device 10 may include one or more of a microprocessor 26, image processing circuit 16, display driver 18, NVM controller 28, audio driver 22 (e.g. D/A converter, A/D converter, an audio coder and/or decoder (codec), amplifier, etc.), and other processing circuits. Processing circuit 32 can include various types of processing circuitry, digital and/or analog, and may include one or more of a microprocessor, microcontroller, application-specific integrated circuit (ASIC), field programmable gate array (FPGA), or other circuitry configured to perform various input/output, control, analysis, and other functions. In various embodiments, the processing circuit 32 may include a central processing unit (CPU) using any suitable processor or logic device, such as a as a general purpose processor. Processing circuit 32 may include, or be implemented as, a chip multiprocessor (CMP), dedicated processor, embedded processor, media processor, input/output (I/O) processor, co-processor, a microprocessor such as a complex instruction set computer (CISC) microprocessor, a reduced instruction set computing (RISC) microprocessor, and/or a very long instruction word (VLIW) microprocessor, a processor implementing a combination of instruction sets, a controller, a microcontroller, an application specific integrated circuit (ASIC), a field programmable gate array (FPGA), a programmable logic device (PLD), or other processing device in accordance with the described embodiments.

Processing circuit 32 may be configured to digitize data, to filter data, to analyze data, to combine data, to output command signals, and/or to process data in some other manner. Processing circuit 32 may be configured to perform digital-to-analog conversion (DAC), analog-to-digital conversion (ADC), modulation, demodulation, encoding, decoding, encryption, decryption, etc. Processing circuit 32 (e.g. microprocessor 26) may be configured to execute various software programs such as application programs and system programs to provide computing and processing operations for device 10.

Processing circuit 32 may also include a memory that stores data. Processing circuit may include only one of a type of component (e.g. one microprocessor), or may contain multiple components of that type (e.g. multiple microprocessors). Processing circuit 32 could be composed of a plurality of separate circuits and discrete circuit elements. In some embodiments, processing circuit 32 will essentially comprise solid state electronic components such as a microprocessor (e.g. microcontroller). Processing circuit 32 may be mounted on a single board in a single location or may be spread throughout multiple locations which cooperate to act as processing circuit 32. In some embodiments, processing circuit 32 may be located in a single location and/or all the components of processing circuit 32 will be closely connected.

Components shown as part of a single processing circuit 32 in the figures may be parts of separate processing circuits in various embodiments covered by the claims unless limited by the claim to a single processing circuit (e.g. location circuit 24 may be part of a separate assembly having a separate microprocessor that interfaces with processing circuit 32 through data port 40).

Hand-held device 10 may also include a network transceiver 44. Transceiver 44 may operate using one or more of a LAN standard, a WLAN standard, a Bluetooth standard, a Wi-Fi standard, an Ethernet standard, and/or some other standard. Network transceiver 44 may be a wireless transceiver such as a Bluetooth transceiver and/or a wireless Ethernet transceiver. Wireless transceiver 44 may operate using an IEEE 802.11 standard. Hand-held device 10 may also include an external device connector 40 (such as a serial data port) for transferring data. External device connector 40 may also serve as the connector 54 to an external power supply. Hand-held device may contain more than one of each of transceiver 44 and external device connector 40. For example, network transceiver 44 may include both a Bluetooth and an IEEE 802.11 transceiver.

Network transceiver 44 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of wireless network systems offering data communication services may include the Institute of Electrical and Electronics Engineers (IEEE) 802.xx series of protocols, such as the IEEE 802.11a/b/g/n series of standard protocols and variants (sometimes referred to as "WiFi"), the IEEE 802.16 series of standard protocols and variants (sometimes referred to as "WiMAX"), the IEEE 802.20 series of standard protocols and variants, and so forth.

Hand-held device 10 may be capable of operating as a mobile phone. The mobile phone may use transceiver 44 and/or may use a cellular transceiver 36. Cellular transceiver 36 may be configured to operate as an analog transceiver, a digital transceiver (e.g. a GSM transceiver, a TDMA transceiver, a CDMA transceiver), or some other type of transceiver. Cellular transceiver 36 may be configured to transfer data (such as image files) and may be used to access the Internet 42 in addition to allowing voice communication. Cellular transceiver 36 may be configured to use one or more of an EV-technology (e.g. EV-DO, EV-DV, etc.), an EDGE technology, a WCDMA technology, and/or some other technology.

Transceiver 44 may be arranged to perform data communications in accordance with different types of shorter range wireless systems, such as a wireless personal area network (PAN) system. One example of a wireless PAN system offering data communication services includes a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), etc.—as well as one or more Bluetooth Profiles, etc. Other examples may include systems using an infrared technique.

Cellular transceiver 36 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth.

In addition to voice communications functionality, the cellular transceiver 36 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

Hand-held device 10 may include one or more user input devices 31 (e.g. button, switch, touch screen, keyboard, keypad, voice command circuit, etc.) for registering commands from a user on device 10. Some or all of user input devices 31 may interface with a switch control circuit (not shown) configured to interpret which switches have been actuated. User input device 31 may include an alphanumeric keyboard. The keyboard may comprise, for example, a QWERTY key layout and an integrated number dial pad. A keyboard integrated into a hand-held device would typically be a thumb keyboard. User input device 31 may also include various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. Any of user input devices 31 may be concealable behind a body (e.g. a sliding body, a flip-out body, etc.) such that they are hidden when the body is in a first position and visible when the body is in the second position.

Hand-held device 10 may include one or more location determining circuits 24 (e.g. a GPS circuit and/or a cell-based location determining circuit) configured to determine the location of device 10. Device 10 may be configured to receive inputs from more than one location determining circuit 24. These inputs can be compared such that both are used, one (e.g. a cell-based system) can be used primarily when the other (e.g. GPS) is unable to provide reliable location information, or can have some other functional relationship.

Device 10 may use one or more different location determining techniques to derive the location of the device 10 based on the data from location determining circuit 24.

For example, device 10 may use one or more of Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Hand-held device 10 may include one or more audio circuits 20 (e.g. speakers, microphone, etc.) for providing or receiving audio information to or from a user. In one example, hand-held device 10 includes a first speaker 20 designed for regular phone operation. Hand-held device 10 may also include a second speaker 20 for louder applications such as speaker phone operation, music or other audio playback (e.g. an mp3 player application), etc. Hand-held device 10 may also include one or more audio ports 20 (e.g. a headphone connector) for output to an external speaker and/or input from an external microphone. Audio circuit 20 may be under the control of one or more audio drivers 22 which may include D/A converters and/or an amplifier.

Hand-held device 10 may include a camera 12 for taking pictures using device 10. Camera 12 may include a CCD sensor, a CMOS sensor, or some other type of image sensor capable of obtaining an image (particularly, images sensors capable of obtaining an image formed as an array of pixels). The image sensor may have a resolution of at least about 65,000 pixels or at least about 1 megapixel. In some embodiments, the image sensor may have a resolution of at least about 4 megapixels. Camera 12 may also include read-out electronics for reading data from the image sensor. Image processing circuit 16 may be coupled to the camera 12 for processing an image obtained by the camera. This image processing may include format conversion (e.g. RGB to YCbCr), white balancing, tone correction, edge correction, red-eye reduction, compression, CFA interpolation, etc. Image processing circuit 16 may be dedicated hardware that has been optimized for performing image processing.

Hand-held device 10 may include a display 14 for displaying information to a user. Display 14 could be one or more of an LCD display (e.g. a touch-sensitive color thin-film transistor (TFT) LCD screen), an electroluminescent display, a carbon-nanotube-based display, a plasma display, an organic light emitting diode (OLED) display, and some other type of display. Display 14 may be a touch screen display such that a user may input commands by approaching (e.g. touching) display 14 (including touch screens that require a specialized device to input information). Display 14 may be a color display (e.g., 16 or more bit color display) or may be a non-color (e.g. monotone) display. Display 14 may be controlled by a display driver 18 that is under the control of a microprocessor 26. In some embodiments, display 14 may be used with a stylus. Display 14 may be used as an input to a handwriting recognizer application.

Hand-held device 10 may include a dedicated memory 34 fixed to device 10. Memory 34 may be implemented using any machine-readable or computer-readable media capable of storing data such as erasable or non-erasable memory, writeable or re-writeable memory, and so forth. Dedicated memory 34 may be a non-volatile memory, may be a volatile memory, or may include both volatile and non-volatile memories. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information. In one embodiment, fixed memory 34 is a non-volatile memory.

Although the memory 34 is shown as being separate from and external to processing circuit 32 some portion or the entire memory 34 may be included on the same integrated circuit as processing circuit 32 (e.g. the same integrated circuit as microprocessor 26).

Hand-held device 10 may include a removable memory port 38 configured to receive a removable memory medium, and/or other components. Removable memory port 38 may also serve as an external device connector 40. For example, removable memory port may be an SDIO card slot which can be used to receive memory cards, receive cards input and/or output data, and combined cards having both memory and input/output functions.

Memory 34 and/or memory 38 may be arranged to store one or more software programs to be executed by processing circuit 32.

Dedicated memory 34 and removable memory 38 may be connected to and/or under the control of a common memory controller 28 such as a non-volatile memory controller. Memory controller 28 may be configured to control reading of data to and writing of data from dedicated memory 34 and/or removable memory 38.

Handheld device 10 may be configured to connect to one or more servers 46,48 via a network 42 (such as the Internet) using one or more of network transceiver 44, cellular transceiver 36, and external device connector 40.

Hand-held device 10 may also include a power supply circuit 52 configured to regulate power supply in hand-held device 10. Power supply circuit 52 may be configured to do one or more of control charging of battery 56, to communicate the amount of power remaining in battery 56, determine and/or communicate whether an external power supply is connected, switch between the external power supply and the battery, etc. Battery 56 may be a rechargeable battery and may be removable or may be fixed to device 10. Battery 56 may be formed from any number of types of batteries including silver-based batteries (e.g. silver-zinc, magnesium-silver-chloride, etc.), a lithium-based battery (e.g. lithium-ion, lithium-polymer, etc.), a nickel-based battery (nickel-cadmium, nickel-metal-hydride, etc.), zinc-based batteries (e.g. silver-zinc, carbon-zinc, etc.), etc. External power supply connector 54 may be configured to be connected to a direct current source, an alternating current source, or both DC and AC sources.

Device 10 may have an optical viewfinder (not shown), may use display 14 as a digital viewfinder, may include some other type of view finder, may include multiple types of view finders, or may not include a view finder.

Device 10 may be configured to connect to the Internet 42, which may be a direct connection (e.g. using cellular transceiver 36, external device connector 40, or network transceiver 44) or may be an indirect connection (e.g. routed through external device 50). Device 10 may receive information from and/or provide information to the Internet. Device 10 may include a web browser configured to display information received from the Internet (including information which may be optimized by the browser for display on portable device 10). Device 10 may connect to one or more remote servers 46,48 using the Internet. Device 10 could also connect to another personal electronic device 50 by way of the Internet.

Device 10 may comprise an antenna system (not illustrated) for transmitting and/or receiving electrical signals. Each of the transceivers 36,44 and/or location circuit 24 may include individual antennas or may include a common antenna system. The antenna system may include or be implemented as one or more internal antennas and/or external antennas.

Portable device 10 may comprise a subscriber identity module (SIM) coupled to processing circuit 32. The SIM may comprise, for example, a removable or non-removable smart card arranged to encrypt voice and data transmissions and to store user-specific data for allowing a voice or data communications network to identify and authenticate the user. The SIM may store data such as personal settings specific to the user.

Device 10 (e.g. processing circuit 32) may be configured to run any number of different types of applications. Examples of application programs may include, for example, a phone application (e.g. a telephone application, a voicemail application, etc.), a messaging application (e.g. an e-mail application, an instant message (IM) application, a short message service (SMS) application, a multimedia message service (MMS) application), a web browser application, a personal setting application (e.g. a personal information manager (PIM) application), a contact management application, a calendar application (e.g. a calendar application, a scheduling application, etc.), a task management application, a document application (e.g. a word processing application, a spreadsheet application, a slide application, a document viewer application, a database application, etc.), a location application (e.g. a positioning application, a navigation application, etc.), an image application (e.g. a camera application such as a digital camera application and/or a video camera application, an image management application, etc.) including media player applications (e.g. a video player application, an audio player application, a multimedia player application, etc.), a gaming application, a handwriting recognition application, and so forth. The application software may provide a graphical user interface (GUI) to communicate information between the portable device 10 and a user.

Device 10 may include personal organizer applications such as a calendar application, a contacts application, and a task application. The calendar application may allow a user to schedule events, set alarms for events, and store a wide variety of information for events (e.g. name of the event, location of the event, other attendees of the event, etc.). The contacts application may allow a user to save contact information for a contact such as phone number information (which may be shared with a phone application), address information, group information (e.g. which user created group or groups the contact belongs to), and other information about the contact. The task application allows a user to keep track of pending and/or completed tasks.

Device 10 may also include one or more network connection protocol applications that allow a user to transfer data over one or more networks. Network applications may be configured to allow device 10 to access a remote device such as server 46,48.

Device 10 may include an Internet browser application that allows a user to browse the internet. The Internet browser application may be configured to alter the data received from Internet sites so that the data can be easily viewed on portable device 10.

Referring to FIGS. 1 and 11A-11F, a hand-held portable computing device 600 (e.g. smartphone) includes a number of user input devices 31. The user input devices include a send button 604 configured to select options appearing on display 603 and/or send messages, a 5-way navigator 605 configured to navigate through options appearing on display 603, a power/end button 606 configured to select options appearing on display 603 and to turn on display 603, a phone button 607 usable to access a phone application screen, a calendar button 608 usable to access a calendar application screen, a messaging button 609 usable to access a messaging application screen, an applications button 610 usable to access a screen showing available applications, a thumb keyboard 611 (which includes a phone dial pad 612 usable to dial during a phone application), a volume button 619 usable to adjust the volume of audio output of device 600, a customizeable button 620 which a user may customize to perform various functions, a ringer switch 622 usable to switch the smartphone from one mode to another mode (such as switching from a normal ringer mode to a meeting ringer mode), and a touch screen display 603 usable to select control options displayed on display 603. Touch screen display 603 is also a color LCD display 14 having a TFT matrix.

Smartphone 600 also includes audio circuits 20. The audio circuits 20 include phone speaker 602 usable to listen to information in a normal phone mode, external speaker 616 louder than the phone speaker (e.g. for listening to music, for a speakerphone mode, etc.), headset jack 623 to which a user can attach an external headset which may include a speaker and/or a microphone, and microphone 625 which can be used to pick up audio information such as the user's end of a conversation during a phone call.

Smartphone 600 also includes a status indicator 601 that can be used to indicate the status of Smartphone 600 (such as messages pending, charging, low battery, etc.), a stylus slot 613 for receiving a stylus such as a stylus usable to input data on touch screen display 603, a digital camera 615 (see camera 12) usable to capture images, a mirror 614 positioned proximate camera 615 such that a user may view themselves in mirror 614 when taking a picture of themselves using camera 615, a removable battery 618 (see battery 56), and a connector 624 (see external data connector 40 and external power supply 54) which can be used to connect device 600 to either (or both) an external power supply such as a wall outlet or battery charger or an external device such as a personal computer, a gps unit, a display unit, or some other external device.

Smartphone 600 also includes an expansion slot 621 (see removable memory 38) which may be used to receive a memory card and/or a device which communicates data through slot 621, and a SIM card slot 617, located behind battery 618, configured to receive a SIM card or other card that allows the user to access a cellular network.

In various embodiments, device 10 and device 600 may include a housing 640. Housing 640 could be any size, shape, and dimension. In some embodiments, housing 640 has a width 652 (shorter dimension) of no more than about 200 mm or no more than about 100 mm. According to some of these embodiments, housing 640 has a width 652 of no more than about 85 mm or no more than about 65 mm. According to some embodiments, housing 640 has a width 652 of at least about 30 mm or at least about 50 mm. According to some of these embodiments, housing 640 has a width 652 of at least about 55 mm.

In some embodiments, housing 640 has a length 654 (longer dimension) of no more than about 200 mm or no more than about 150 mm. According to some of these embodiments, housing 640 has a length 654 of no more than about 135 mm or no more than about 125 mm. According to some embodiments, housing 640 has a length 654 of at least about 70 mm or at least about 100 mm. According to some of these embodiments, housing 640 has a length 654 of at least about 110 mm.

In some embodiments, housing 640 has a thickness 650 (smallest dimension) of no more than about 150 mm or no more than about 50 mm. According to some of these embodiments, housing 640 has a thickness 650 of no more than about 30 mm or no more than about 25 mm. According to some embodiments, housing 640 has a thickness 650 of at least about 10 mm or at least about 15 mm. According to some of these embodiments, housing 640 has a thickness 650 of at least about 50 mm.

While described with regards to a hand-held device, many embodiments are usable with portable devices which are not handheld and/or with non-portable devices/systems.

While some components of the Figures were discussed as being singular and others were discussed as being plural, the invention is not limited to devices having these same numbers of each type of component. Embodiments are conceived where each combination of plural and singular components exist.

In some embodiments, the various components shown in FIG. 1 may be combined in a single component. For example, in some embodiments, removable memory 38 may also be an external device connector 40 (such as an SDIO card slot which can be used to receive memory cards, input and/or output data, and combined devices having both memory and input/output functions). As another example, in some embodiments, a single connector could serve as both an external device connector 40 and as a connection to an external power supply 54.

Also, in some embodiments, the function of various claim components shown in FIG. 1 may be performed by a combination of distinct electrical components. For instance, a location circuit 24 may have a separate microprocessor that works in combination with the main microprocessor 26 of the system to perform the functions of the processing circuit 32. As another example, image processing circuit 16 may make use of the electronics of camera 12 to perform image processing, while also having other, discrete electronic components.

A number of references have been made to transmitters, receivers, and/or transceivers. Each reference to a transmitter or receiver is equally applicable to a transceiver. Reference in the claim to a transmitter or receiver is also a reference to a transceiver unless it is explicitly stated that the claim is referencing an independent transmitter or receiver. Reference to functions achieved by a transceiver above could also be accomplished by combining an independent transmitter and receiver. Reference in the claims to a transceiver can also be a reference to a transmitter-receiver combination unless reference is made in the claim to a unitary transceiver.

Much of the description has been made with respect to a device 10 with a single housing. However, device 10 may include a two-part housing (such as a clam-shell housing), which two-part housing may include a closed position and an open (use) position. For a two-part housing, reference to a side of the phone in the claims below is a reference to a side of the phone in its use position unless expressly stated otherwise. Also, for a two-part housing, the description above to a side of the phone is conceived to be applicable to both (either) sides of the phone in its use position and/or to sides of the phone in its non-use position.

All of the discussion for the embodiment shown in FIGS. 2A-E which have an external antenna 101 is also equally applicable to the embodiment shown in FIGS. 6A-F which do not have an external antenna. For example, speaker 616 may be equivalent to speaker 120, and speaker 602 may be equivalent to speaker 104. Also, the various features disclosed with respect to the embodiment of FIGS. 6A-F are also applicable to the embodiment of FIGS. 2A-E.

It is contemplated that any of the features disclosed above may be used in combination with any of the other features discussed above unless the are wholly incompatible, even though such features may be disclosed with respect to different embodiments.

While the discussion above referenced using the telecoil signal to transfer voice data received over a cellular network using a cellular receiver, the discussion above is equally applicable to transferring voice data from other sources, such as voice data transferred over a local area network (or other network discussed above) using a receiver such as transceiver 44. The telecoil signal could also be used to transfer non-voice data such as music data.

What is claimed is:

1. A mobile phone comprising:
a transceiver configured to transfer voice information between the mobile phone and a network; and
a speaker configured to provide speakerphone operation, the speaker including an audio circuit configured to provide signals that cause the speaker to output audible sound;
wherein the audio circuit is configured to provide a signal configured to be received by a telecoil of a hearing aid, wherein the audio circuit comprises a coil configured to cause vibrations in the speaker which are output as sound, the coil also configured to provide a magnetic field capable of being received by the telcoil of the hearing aid; and
wherein a telecoil listening position is substantially different than a normal listening position, wherein the phone is configured such that a user holds a first side of the phone to their ear for the normal listening position and a user holds a second side of the phone opposite the first side of the phone to their ear for the telecoil listening position.

2. The mobile phone of claim 1, wherein the speaker comprises a speakerphone speaker, and wherein the mobile phone further comprises a second speaker configured to provide private phone operation.

3. The mobile phone of claim 2, wherein the speakerphone speaker and the second speaker are located on different faces of a housing of the mobile phone.

4. The mobile phone of claim 1, further comprising a housing having a first face that includes a display, wherein the speaker outputs sound on a second face of the housing, the second face being a different face than the first face.

5. The mobile phone of claim 4, wherein the second face is opposite the first face, wherein the first face further comprises a dial pad.

6. The mobile phone of claim 1, further comprising
a housing having a first side and a second side opposite the first side; and
an antenna adjacent the first side;
wherein the speaker is adjacent the second side.

7. The mobile phone of claim 1, wherein the speaker is configured such that the speaker provides audible sound whenever the telecoil is used.

8. The mobile phone of claim 1, further comprising a housing that includes the speakerphone, the housing having a thickness of up to about 50 mm, a width of up to about 100 mm, and a length of up to about 150 mm.

9. The mobile phone of claim 1, further comprising a camera and a processing circuit configured to provide an organizer application.

10. The mobile phone of claim 1, wherein the transceiver comprises a cellular transceiver.

11. The mobile phone of claim 1, wherein the speaker has a diameter of at least about 15 mm.

12. The mobile phone of claim 11, wherein the speaker has a diameter of up to about 30 mm.

13. The mobile phone of claim 1, wherein the signal capable of being received by a telecoil of a hearing aid from the audio circuit is not capable of being effectively received when a user's ear is on a same face of a housing as a dialpad of the mobile phone.

14. The mobile phone of claim 1, further comprising a microprocessor configured to receive voice data from a cellular network and to provide an output signal in response to and based on the reception of the voice data, wherein the speaker and audio circuit comprise an amplifier configured to amplify a signal based on the output signal, a coil configured to receive the amplified signal and vibrate an armature such that sound is produced as a result of the vibration, the coil further configured to produce the signal capable of being received by a telecoil of a hearing aid based on the amplified signal.

15. The mobile phone of claim 1, further comprising
a microprocessor configured to receive voice data from a cellular network and to provide a voice data output signal in response to and based on the reception of the voice data,
wherein at least one of the speaker and audio circuit comprise an amplifier configured to amplify a signal based on the voice data output signal, and
wherein at least one of the speaker and audio circuit comprise a coil configured to produce the signal capable of being received by a telecoil of a hearing aid,
wherein the processing circuit is further configured to run a music application and output a music output signal based on the music application, the amplifier is configured to amplify a signal based on the music output signal, and the coil is configured to cause a cooperating member to vibrate such that sound is produced based on the amplified signal based on the music output signal.

16. A mobile phone comprising:
a cellular transceiver configured to transfer voice information between the mobile phone and a cellular network;
a first speaker configured to output audible sound at a first volume;
a second speaker configured to output audible sound at a second volume louder than the first volume, the second speaker including an audio circuit configured to provide signals that cause the speaker to output audible sound;
wherein the audio circuit is configured to provide a signal configured to be received by a telecoil of a hearing aid, wherein the audio circuit comprises a coil configured to cause vibrations in the second speaker which are output as sound, the coil also configured to provide a magnetic field capable of being received by the telecoil of the hearing aid; and
wherein a telecoil listening position is substantially different than a normal listening position, wherein the phone is configured such that a user holds a first side of the phone to their ear for the normal listening position and a user holds a second side of the phone opposite the first side of the phone to their ear for the telecoil listening position.

17. A mobile phone comprising:
a cellular transceiver configured to transfer voice information between the mobile phone and a cellular network;
a display configured to display information to a user, the display located on a first side of the phone; and
a speaker including a circuit configured to output audible sound, the speaker outputting sound from a second side of the phone, the circuit being configured to provide a signal configured to be received by a telecoil of a hearing aid;
wherein a telecoil listening position is substantially different than a normal listening position, wherein the phone is configured such that a user holds a first side of the phone to their ear for the normal listening positions and a user holds a second side of the phone opposite the first side of the phone to their ear for the telecoil listening position.

18. The phone of claim 17, further comprising a housing having a first face and a second face, the first face being on the first side of the phone and the second face being on the second side of the phone; wherein the display is located on the first face and the speaker is configured to output sound from the second face.

19. The phone of claim 18, wherein the housing has a thickness of up to about 50 mm, a width of up to about 100 mm, and a length of up to about 150 mm.

20. The phone of claim 17, wherein the first side of the phone is opposite the second side of the phone.

21. A mobile phone comprising:

a cellular transceiver configured to transfer voice information between the mobile phone and a cellular network;

a speaker for outputting audible sounds based on voice data received by the cellular transceiver in a private listening mode, the phone configured to have a normal listening position for listening to voice signals based on the voice data received by the cellular transceiver that is output by the speaker; and a telecoil for outputting magnetic fields based on voice data received by the cellular transceiver, the phone configured to have a telecoil listening position for listening to voice signals based on the voice data received by the cellular transceiver that is output by the telecoil, wherein the telecoil listening position is substantially different than the normal listening position, wherein the phone is configured such that a user holds a first side of the phone to their ear for the normal listening position and a user holds a second side of the phone opposite the first side of the phone to their ear for the telecoil listening position.

* * * * *